Nov. 7, 1950 C. A. NERACHER 2,528,772
TRANSMISSION CONTROL
Filed Aug. 30, 1946 3 Sheets—Sheet 1

INVENTOR.
Carl A. Neracher
BY
Harness and Harris
ATTORNEYS.

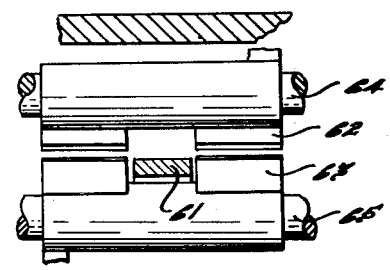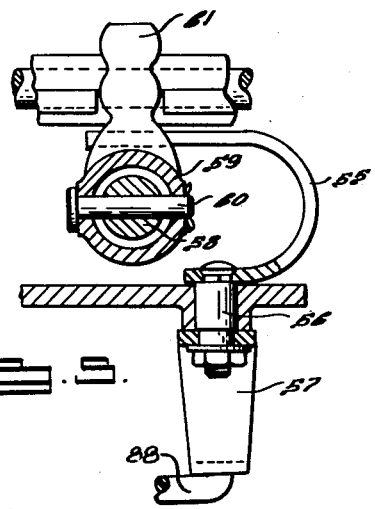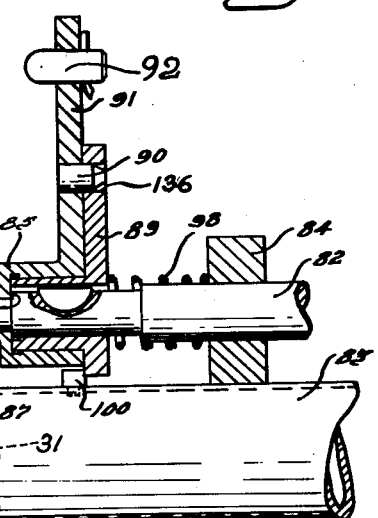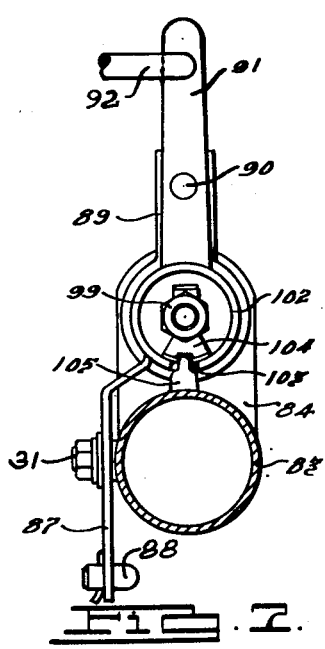

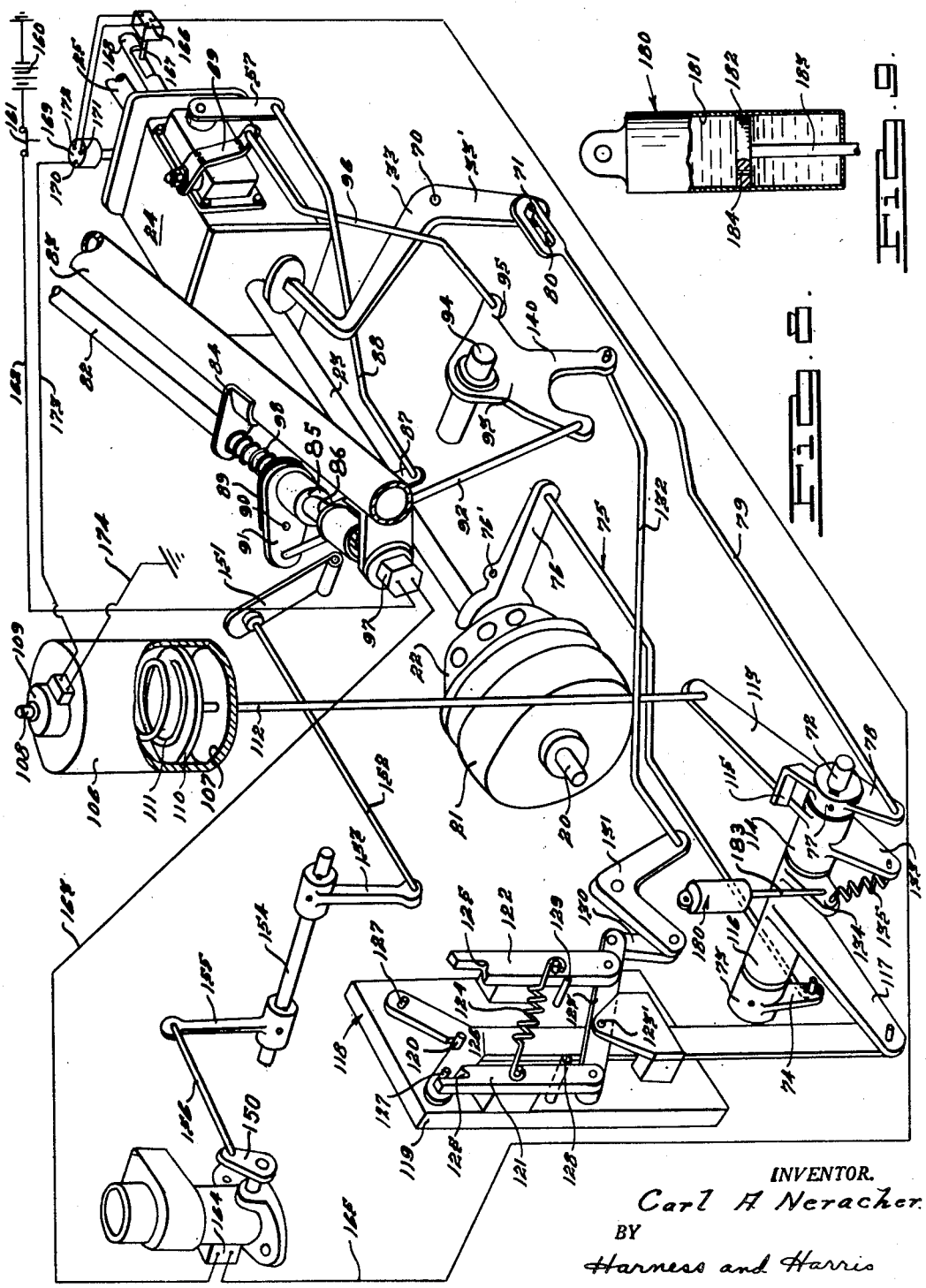

Patented Nov. 7, 1950

2,528,772

UNITED STATES PATENT OFFICE 2,528,772

TRANSMISSION CONTROL

Carl A. Neracher, Detroit, Mich., assignor to Chrysler Corporation, Highland Park, Mich., a corporation of Delaware Application August 30, 1946, Serial No. 694,084

13 Claims. (Cl. 192—3.5)

This invention relates to automotive vehicle transmission controls and more particularly to the combination of automatic means for changing the speed ratio drive of the transmission with damping means which controls the automatic means and with manual means for changing the speed ratio drive independently of the damping means.

Apparatuses for automatically changing the speed ratio drives in motor vehicle transmissions have been developed. These apparatuses are usually responsive to driver signal as, for example, by throttle closing within predetermined vehicle speed limits to initiate a cycle including a clutch disengagement, a change in transmission speed ratio drive and a clutch reengagement. The transmissions usually have incorporated therein a synchronizer, one type of which is illustrated and described in Patent No. 2,238,723 issued to O. E. Fishburn on April 15, 1941. A fast, non-yielding application of force to the controls of such transmissions is undesirable as the synchronizers require a time interval in which to operate. In automatic control systems it has been found necessary to incorporate a means for rendering the application of force to the transmission control lever somewhat yielding in nature. In addition it has been found desirable to dampen the movement of transmission elements by a dashpot or equivalent device to avoid clashing of the elements and to effect a quiet shift. It is common to provide a manual control of the transmission elements and because a control of this type is inherently slow in motion and regulated by the driver the damping and yielding means referred to above are not required in the manual control system. In fact, they are undesirable in the manual system because a dashpot or its equivalent increases the manual force required to control the transmission.

It is an object of this invention to selectively move a single transmission control element either by automatic means which is regulated by damping means or by manual means which is adapted to actuate the control element independently of the damping means.

The invention will be described herein in conjunction with a suggested transmission and clutch control apparatus as a typical application thereof although it is not intended that the invention be limited to the associated apparatus described therein.

In the drawings:

Fig. 4 is a section on the line 4—4 of Fig. 3;

Fig. 5 is a section on the line 5—5 of Fig. 3;

Fig. 6 is a vertical section of selector apparatus on the lower portion of the manual shift control rod;

Fig. 7 is a view taken on the line 7—7 of Fig. 6;

Fig. 8 is a diagrammatic view of a transmission and clutch control apparatus of which my invention forms a component part; and Fig. 9 is a partial vertical section of a dash pot.

Figure 1:
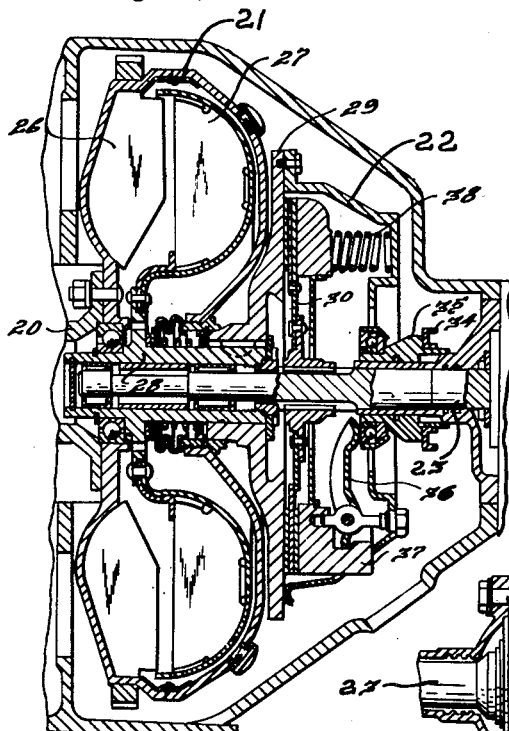
Fig. 1 is a longitudinal sectional elevation through the main clutch mechanism.

In a motor vehicle, the usual internal combustion engine having a crankshaft 20 drives through fluid coupling 21 and a conventional type of friction main clutch 22 through shaft 23 to a variable speed ratio transmission 24 from which the drive passes from the output shaft 25 to the vehicle rear wheels in the usual manner.

The engine crankshaft 20 carries the vaned fluid coupling impeller 26 which in the well known manner drives the vaned runner 27 whence the drive passes through hub 28 to clutch driving member 29. This member then transmits the drive when clutch 22 is engaged as in Fig. 1, through driven member 30 to the transmission driving shaft 23 carrying the main drive pinion 32. A clutch pedal 33 controls clutch 22 such that when the driver depresses this pedal yoke 34 and collar 35 are thrust forward to cause levers 36 to release the clutch driving pressure plate 37 against springs 38 thereby releasing the drive between runner 27 and shaft 23. The primary function of the main clutch 22 is to enable shifts to be made manually or automatically in transmission 24.

Figure 2:
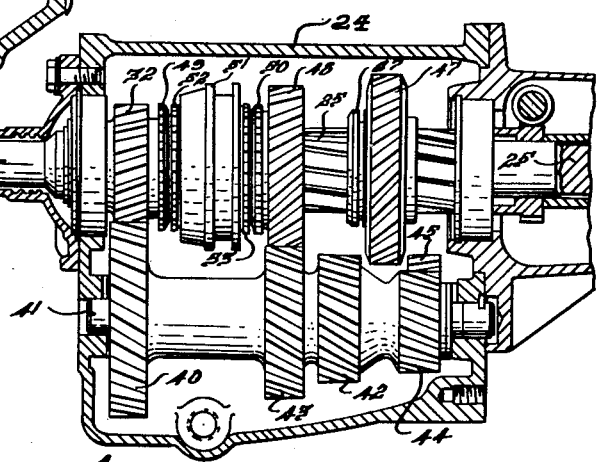
Fig. 2 is a vertical section of a transmission.

Referring to the transmission in Fig. 2 the main drive pinion 32 is in constant mesh with the gear 40 of the countershaft gear cluster mounted for rotation on the countershaft 41. This gear cluster according to well known practice, comprises a low speed gear 42, a second speed gear 43, and a reverse gear 44 which is in constant mesh with the reverse idler gear 45. The transmission driven shaft 25 extends rearwardly to drive the ground wheels of the vehicle.

The driven shaft 25 has mounted thereon the low speed and reverse gear 47 splined to the driven shaft for selective meshing with the countershaft low speed gear 42 or the reverse idler gear 45 for respectively transmitting low speed drive to the driven shaft 25 or the drive thereto in a reverse direction. Freely rotatable on shaft 25 is the second speed gear 48 in constant mesh with the countershaft gear 43 for transmitting a second speed ratio drive. The gear 32 drivingly carries a set of circumferentially spaced external clutch teeth 49. In a similar manner the gear 48 drivingly carries a set of clutch teeth 50.

Splined on the shaft 25 adjacent the forward extremity thereof, is an axially shiftable collar or sleeve 51. Blocker teeth rings 52 and 53 are carried by sleeve 51 and are provided with friction means (not shown) adapted to selectively cooperate with friction means provided with teeth 49 and 50. The blocker teeth rings 52 and 53 are adapted for slight rotation relative to sleeve 51 to facilitate synchronizing of gear speeds prior to clutching of shaft 25 through collar 51 with either gears 32 or 48 in a manner well known in the art.

The transmission is illustrated in its neutral position. To establish the direct or high speed driving connection between shafts 23 and 25, the collar 51 may be shifted axially to the left as viewed in Fig. 2 by the control means hereinafter described to engage the teeth 49 drivingly connected to the gear 32 carried by the driving shaft 23. The collar is drivingly carried by the shaft 25. The second speed driving connection is established by similarly moving the collar 51 to the right as viewed in Fig. 2 to engage teeth 50 carried by gear 48. The first or low speed is obtained by moving gear 47 which is splined to driven shaft 25 forwardly in Fig. 2 into engagement with the countershaft low speed gear 42. The drive then occurs from shaft 23 through main drive pinion 32, countershaft gear 40, countershaft low speed gear 42, gear 47, and driven shaft 25. Reverse drive is obtained by engaging gear 47 with reverse idler gear 45. The transmission mechanism thus described is an embodiment conventionally employed in motor vehicles.

Transmission 24 is provided with control means comprising selector cam 55 keyed to shaft 56 which is keyed to selector lever 57. Rotation of selector lever 57 rotates cam 55, the outward end of cam 55 is lifted by this movement (see Figs. 3 and 5). Control shaft 58 (Fig. 3) is rotatably mounted in the transmission housing. Cylindrical lever 59 surrounds shaft 58 and pin 60 mounted normally to the axis of the shaft fastens the lever to the shaft. Relative axial rotation is prevented by pin 60 but slight rotation of lever 59 on pin 60 is possible. Cylindrical lever 59 is provided with finger 61 adapted to penetrate the openings provided in forks 62 and 63 on shift rails 64 and 65. Spring 66 urges finger 61 to its downward position. Fork 62 engages collar 67 on low speed and reverse gear 47. Fork 63 engages collar 51 for selecting second or direct transmission drive. Gear shift fork guide rail 68 supports the weight of forks 62 and 63. As illustrated in Fig. 4, finger 61 is normally in engagement with the fork 63 on the second speed and direct drive shift rail.

In operation, finger 61 is lifted or lowered to select the fork 62 or 63 which finger 61 is to move. Rotation of shaft 58, cylindrical lever 59, and finger 61 move the selected shift rail, fork, and collar to the left or right in Fig. 2 depending upon the direction of rotation of shaft 58. Lever 69 is provided and keyed to shaft 58 to rotate the latter.

Manual means are provided in the apparatus illustrated in Fig. 8 for the operation of the clutch and control of the transmission speed ratio drive. The clutch pedal 33 is rotatably mounted at 70 on a shaft, not shown. An extension 33' of clutch pedal 33 depends below rotatable mounting 70 and has fixed thereto a pin 71. A torque shaft 72 has one end thereof rotatably mounted on the vehicle frame, not shown, and the other end rotatably mounted adjacent the engine block, not shown, in a manner well known in the art. A collar 77 keyed to shaft 72 is provided with depending arm 78. A rod 79 operatively connects arm 78 with pin 71. A slot 80 provided in rod 79 permits relative movement in one direction between rod 79 and pin 71. A collar 73 is keyed to torque shaft 72. Collar 73 is provided with a depending arm 74. A rod 75 connects arm 74 with clutch throwout fork 76 which is pivoted at 76'. Clutch throwout fork 76 engages collar 34. It will thus be seen that depression of clutch pedal 33 rotates extension 33' about rotatable mounting 70 and through pin 71 retracts rod 79 and rotates arm 78, shaft 72, collar 73, and arm 74 to push a rod 75 and rotate clutch throwout fork 76 about its pivotal mounting 76' thereby moving collar 34 and disengaging the clutch 22.

A manual shift control rod 82 is shown in Fig. 8 as supported by the steering column housing 83 by bracket 84. The manual shift control rod 82 is slidably mounted in the bracket 84 and adapted for both axial and rotary movement. As is usual in the art, the axial movement is adapted to select the transmission shift rail 64 or 65 which is to be moved by finger 61 (Fig. 4), and rotation of the shift control rod 82 slides the shift rail in one of two directions (depending upon the direction of rod rotation) through the rotation of shaft 58 (Fig. 3) as described above. This effects the desired transmission speed ratio drive connection. A pair of spaced circumferential collars 85 and 83 located adjacent the base of rod 82 receive therebetween the end of a lever 87 which is rotatably mounted at 31 adjacent its mid portion to the steering column housing 83. A rod 88 connects lever 87 with transmission selector lever 57. Axial movement of rod 82 is transmitted through this linkage to the selector lever 57.

An arm 89 is keyed to rod 82 and carries with it through pin 90 an arm 91 during manual rotation of rod 82. A depending rod 92 connects arm 91 with a rotatable lever 93 mounted on shaft 94. An arm 95 of lever 93 is connected to transmission shift lever 69 through rod 96. Rotation of rod 82 through the linkage just described rotates shift lever 69 and shaft 58 (Fig. 3) for manual transmission control.

Figure 3:
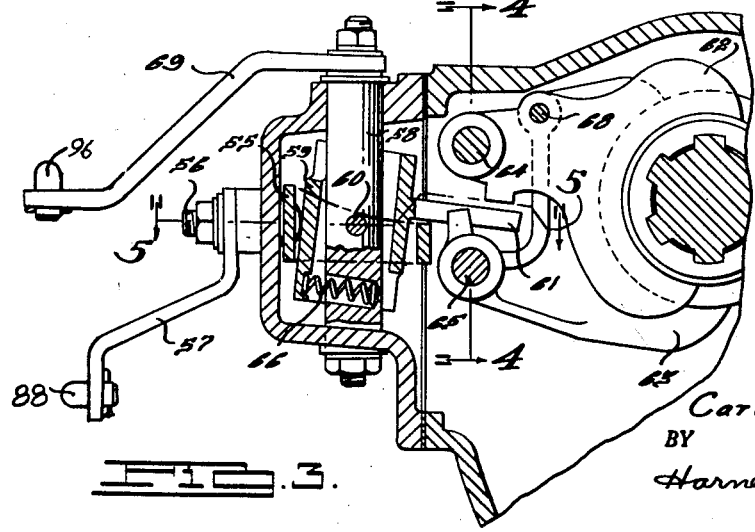
Fig. 3 is a sectional elevation of a portion of the mechanism carried by the transmission housing.

In Fig. 8 automatic means have been superimposed on the manual controls just described. The automatic means depends for actuation upon the closing of a switch 97 provided adjacent the collar portion of rod 82 and it also depends upon the deactivation of manual control rod 82. Figs. 6 and 7 illustrate a mechanism by which this is accomplished. The shift control rod 82 is provided with a spring 98 which urges arms 89, 91, bolt 99, and the rod 82 to a downward position or to the left in Fig. 6. It should be noted that a space is provided above the position of arm 89 illustrated in Fig. 6 in which this arm and the rod 82 may move to the right thereby permitting normal selection during manual operation. A lug 100 on steering control rod housing 83 engages a portion of rod 89 to limit the movement of rod 89 to the left in Fig. 6. A shoulder 101 on rod 82 engages collar 85 and the collar 85 is secured to the rod 82 by nut 99. The only connection between arms 89 and 91 is made by a pin 90 carried by arm 91 and which penetrates an opening 136 provided in arm 89. Thus arms 89 and 91 are adapted to rotate together but may be separated by axial movement of rod 82. A collar 102 secured to the lower end of shift control rod 82 by nut 99 has a slot 103 provided therein and a spring 104 positioned above the slot. A detent 105 secured to the steering column housing 83 is adapted to penetrate the slot 103 when the shift control rod 82 is rotated to a predetermined position, preferably the "second speed" position usually provided in a transmission. Thus when the rod 82 is rotated to the predetermined position, further downward motion is possible with the detent 105 entering slot 103 instead of engaging collar 102. The detent 100 restrains arm 89 from movement and since the arm 91 is engaged by shoulder 101 on rod 82 the arms 89 and 91 are separated and the pin 90 leaves the opening 136. The switch 97 is closed by this movement and the rod 82 is operatively disconnected from the rod 92 so that any automatic actuation of levers 93 and 69 will not be transmitted to the rod 82. It should be noted that the additional downward movement of rod 82 required to close switch 97 rotates arm 87 and moves rod 88 and selector lever 57. This is possible because as shown in Fig. 3 the cam 55 is not connected to finger 61 and is capable of unrestricted downward motion.

With the shift control rod 82 in the automatic position and the switch 97 closed, the automatic means to be described is adapted to actuate both clutch and transmission. Referring to Fig. 8 an airtight housing 106 containing a cylinder 107 has a tubular connection 108 with the engine intake manifold. A solenoid valve 109 is adapted to selectively open and close this connection and vent cylinder 107. A differential pressure actuated motor is utilized as a prime mover of the automatic control means. This comprises a piston 110 which is slidably mounted in cylinder 107 and a spring 111 which acts on piston 110 and reacts on housing 106 to urge piston 110 to one end of cylinder 107. Manifold low pressure or vacuum as it is commonly referred to, overcomes spring 111 when valve 109 is open. Piston rod 112 connects the piston 110 with an arm 113 carried by a collar 114 rotatably mounted on torque shaft 72. The collar 77 previously referred to is provided with an extension 115 adapted to be engaged by the arm 113 when the latter is rotated in a counterclockwise direction. When cylinder 107 is connected with the manifold through valve 109 and tubular passage 108, piston 110 is raised and piston rod 112 rotates arm 113 in a counterclockwise direction. Arm 113 engages and carries therewith the extension 115 of collar 77 thereby rotating the collar. The collar 77 is keyed to the torque shaft 72 and the torque shaft 72 is thus rotated. Rotation of the shaft 72 rotates the collar 73 keyed thereto and the depending arm 74 pushes rod 75, rotates clutch throwout fork 76, and disengages the clutch 22. The rotation of the collar 77 and depending arm 78 in this counterclockwise direction does not cause a depression of the clutch pedal 33 because of the cooperation of the slot 80 in rod 79 and the pin 71. This pin and slot combination permits movement of rod 79 to the right in Fig. 8 without an accompanying depression of clutch pedal 33. When valve 109 closes cylinder 107 to the manifold and vents the cylinder, spring 111 returns the parts described to their original position permitting the clutch to reengage.

The movement of piston 110 also effects changes in transmission speed ratio drive by the movement of transmission collar 51 illustrated in Fig. 2. The automatic apparatus herein effects changes in speed ratio drive between a relatively slow drive of the driven wheels and a relatively fast drive or between second and direct drive as particularly described in relation to the Fig. 2 transmission. The torque shaft 72 is provided with a collar 116 which is rotatably mounted thereon. An arm 117 is carried by collar 116.

The arm 117 is designed to actuate a device referred to as an alternator and generally designated by the numeral 118. Alternator 118 is adapted to translate successive counterclockwise rotations of arm 117 to alternate counterclockwise and clockwise rotation of transmission shaft 58 (Fig. 3). Referring to the alternator in Fig. 8, a support plate 119 is secured to a stationary object, not shown. A pin 120 projects from the surface of plate 119. A pair of upwardly extending fingers 121 and 122 are rotatably mounted on a lever 123 on opposite sides of its fulcrum 123'. Spring 124 connects fingers 121 and 122 and urges them toward each other. The fingers 121 and 122 each have a recessed portion with a shoulder 125 adjacent the upper end thereof. A bifurcated lever 126 is rotatably connected to arm 117 and has a pin 127 protruding from each fork thereof. The pins 127 are adapted to selectively engage the shoulders 125 of fingers 121 and 122. A pair of pins 128 and 129 guide the fingers and cooperate with the arcuate paths of the connections of the fingers with lever 123 to direct the shoulder 125 portion of the fingers toward the pin 120 when the finger occupies its highest position in Fig. 8. A link 130 and bellcrank 131 transmit motion of lever 123 to a rod 132. In the alternator with the parts in the position shown in Fig. 8, downward motion of arm 117 will pull lever 126 downwardly and one pin 127 will push finger 121 downwardly thereby rotating lever 123 in a counterclockwise direction about fulcrum 123', raising link 130, rotating bellcrank 131, and pulling rod 132 to the left. With lever 123 in this position finger 122 has been raised and the portion thereof connected to lever 123 has been swung outwardly on an arc about the fulcrum 123' with the spring 124 urging the upper portion thereof to the left as far as pin 129 will permit in Fig. 8. When arm 117 is raised the bifurcated lever 126 is centered by the cam action of pin 120 in the crotch thereof so that on its next downward movement the other pin 127 engages shoulder 125 of finger 122 to reverse the movement described above and to thereby push on rod 132. Through this mechanism each successive downward motion of arm 117 reverses the movement of rod 132. The arm 117 is rotated in a counterclockwise direction to initiate the movements described above each time the piston 110 is actuated by the connection of cylinder 107 with the manifold vacuum. As the cylinder is raised in Fig. 8 by the manifold vacuum and the piston rod 112 rotates the arm 113 in a counterclockwise direction the collar 114 is rotated in a counterclockwise direction. The collar 114 and the collar 116 are each rotatably mounted on torque shaft 72 and have arms 133 and 134 extending therefrom. A spring 135 connects arms 133 and 134. Therefore, the rotation of the collar 114 stretches spring 135 which in turn rotates the collar 116 and the arm 117 in order that the alternator 118 may be actuated as described above.

The rod 132 is alternately pushed and pulled by the alternator 118 and is connected to an extended portion 140 of the rotatable lever 93 so that motion of rod 132 through the lever 93 actuates the rod 96 previously described as connected to the transmission shift lever 69. Thus each successive upward movement of piston 110 induces a motion of shift lever 69. These successive motions alternate between clockwise and counterclockwise rotation of the shaft 58. The spring 66 in Fig. 3 urges the finger 61 into engagement with the shift rail 65 at all times when the selector lever 57 is not actuated. During automatic control the selector 57 is not actuated for reasons explained with regard to Fig. 6. Therefore, the successive clockwise and counterclockwise motions of shift lever 69 cause the shift rail 65 to move alternately to the left and to the right in Fig. 2 thereby moving the collar 51 to the left and to the right and causing alternate drives to occur in second speed or direct drive in the transmission of Fig. 2. The spring 135 is adapted to store force transmitted thereto by piston 110 until the blocker teeth 52 are able to utilize the force to effect a change in transmission speed ratio drive. The movement of the piston is rather sudden and a time interval is required for the synchronizer to act.

Carburetor throttle lever 150 is controlled by accelerator pedal 151 through conventional linkage illustrated in Fig. 8. Rod 152 connected to accelerator pedal 151 has its other end connected to lever 153 keyed to rotatably mounted shaft 154. A lever 155 is also keyed to shaft 154 for rotation therewith and rod 156 connects lever 155 with throttle lever 150. Thus actuation of accelerator pedal 151 through rod 152, lever 153, rod 154, lever 155, and rod 156 rotates throttle lever 150.

Means to control the actuation of the piston 110 is illustrated in Fig. 8. A grounded source 160 of electric energy is connected through ignition switch 161 to a switch 97 by electrical conductor 162. Switch 97 is adapted to be closed when the shift control rod 82 is placed in a predetermined position as described above. Electrical line 163 connects switch 97 with a switch 164 adapted to be closed when the throttle is substantially closed. Line 165 connects switch 164 with a two-way shift rail switch 166 having a finger 167 thereon adapted to be engaged by abutments on an extension 168 of the transmission shift rail 65. A first circuit in switch 166 is disconnected and a second circuit is connected when the shift rail has completed its movement. This switch movement alternates with each transmission speed ratio change on the shift rail 65. A vehicle speed responsive governor 169 has one outlet terminal 170 and two inlet terminals 171 and 172 and is adapted to connect the outlet terminal with one inlet terminal below a predetermined speed and with the other inlet terminal above the predetermined speed. Each inlet terminal is connected to one of the circuits referred to for switch 166. Line 173 connects governor terminal 170 with solenoid valve 109 in manifold line 108. Line 174 grounds the circuit. Valve 109 is adapted to connect cylinder 107 with the manifold line 108 when energized and to close line 108 and vent cylinder 107 to atmosphere when not energized. In the operation of the apparatus thus far described when the driver closes switch 97 to select automatic drive and then closes the throttle lever 151 above a predetermined vehicle speed, valve 109 is energized to admit vacuum to cylinder 107. Piston 110 is raised and clutch 22 disengaged through the linkage 112, 113, 115, shaft 72, collar 73, rod 75, and clutch throwout fork 76. This motion of the piston also causes a delayed movement of transmission shift lever 69 and shift rail 65 through arm 113, collar 114, arm 133, spring 135, collar 116, arm 117, alternator 118, rod 132, lever 93, and rod 96. The change in speed ratio drive caused by moving shift lever 69 moves the shift rail 65 and its extension 168 breaks the circuit at switch 166 thereby deenergizing solenoid valve 109 and permitting spring 111 to move piston 110 to the lower end of the cylinder permitting the clutch to reengage. The switch 166 is now connected with its other circuit and a complete electrical circuit will be made when the governor 169 connects the outlet terminal 170 with the other inlet terminal below a predetermined vehicle speed and the driver closes the throttle switch 164 by releasing accelerator pedal 151. The electrical circuit then being complete the solenoid valve 109 is energized and the piston 110 raised to repeat the process. The alternator 118 will this time move the transmission shift lever 69 in the reverse direction from that previously experienced. The shift rail 65 will be moved and the collar 51 moved to cause a second speed drive in the Fig. 2 transmission.

A dash pot 180 is mounted upon a stationary object, not shown. The dash pot comprises a cylinder 181, a piston 182, and a piston rod 183. The cylinder 181 contains a quantity of fluid, preferably oil. The piston 182 is provided with metering orifice 184. The movement of oil through the orifice 184 acts in a well known manner to restrict or dampen movement of piston 182. The dashpot piston rod 183 is conected to the arm 134 of torque shaft collar 116 previously referred to. The dashpot serves to dampen the movements imparted to the transmission collar 51 by the piston 110. When the vacuum cylinder piston rod 112 rotates arm 113 and through spring 135 rotates the collar 116 to actuate the alternator 118 and transmission collar 51, the spring 135 permits variations to occur between the piston movement and alternator or transmission collar movement. The dashpot 180 assures that such variation will occur to the end that the transmission collar 51 is moved at a relatively slow speed while the vacuum cylinder piston is moved relatively rapidly. The dashpot 110 has been so positioned that manual actuation of the transmission collar 51 through the shift control rod 82 and transmission shift lever 69 are independent of the dashpot. Manual shifting through the dashpot would be undesirable in that an increase in the applied force and the time interval would be required by the dashpot. The driver actuation of shift control rod 82 is sufficiently slow and yielding to eliminate the requirement for a dashpot in the manual linkage.

Features of novelty disclosed but not claimed herein are more particularly described and claimed in copending applications, Serial Number 661,298 filed by Carl A. Neracher et al.; Serial Numbers 698,504 and 755,612 filed by Maurice C. Robinson and Serial Numbers 698,451 and 755,661 filed by Otto Schotz, now Patent No. 2,487,482, dated November 8, 1949.

I claim:

1. In a motor vehicle having a variable speed ratio transmission, an element associated with said transmission and adapted to change the transmission speed ratio drive when moved, automatic means operable to move said element, a dashpot operable to retard the movement of said element by said automatic means, and manual means to move said element independently of retarding action by said dashpot.

2. In a motor vehicle having an engine, driving wheels and a variable speed transmission, a movable element associated with said transmission, means to cause movement of said element in a first direction to effect one speed ratio drive of said wheels by said engine, and means to cause movement of said element in a second direction to effect another speed ratio drive of said wheels by said engine, automatic means to move said element in said first direction under predetermined conditions and in said second direction under other conditions, a dashpot operable to retard the movement of said element by said automatic means, and manual means to move said element in said first direction and in said second direction independently of retarding action by said dashpot.

3. In a motor vehicle having a clutch and a transmission, an element associated with said transmission and adapted to change the transmission speed ratio drive when moved, a control mechanism for said element and clutch comprising a pressure differential operated motor adapted to disengage said clutch, move said element and reengage said clutch as an incident to actuation of said motor, a dashpot operable to retard the movement of said element by said motor, manual means to move said element independently of retarding action by said dashpot, and manual means to disengage said clutch.

4. In a motor vehicle, a variable speed ratio transmission having two driving members, a driven member, an element adapted to move to selectively couple either of said driving members to said driven member, automatic means operable to move said element, a dashpot adapted to retard the movement of said element by said automatic means, and manual means to move said element independently of retarding action by said dashpot.

5. In a motor vehicle having a variable speed ratio transmission, a transmission element adapted to change the transmission speed ratio drive when moved, a pressure differential operated motor, control means adapted to control the actuation of said motor in response to predetermined vehicle operating conditions, said motor being operable to move said element, a dashpot controlling the movement of said element when the latter is moved in response to actuation of said motor, and manual means to move said element independently of a retarding action by said dashpot.

6. In a motor vehicle having an engine, driving wheels and a variable speed transmission, a movable element associated with said transmission, means to cause movement of said element in a first direction to effect one speed ratio drive of said wheels by said engine and means to cause movement of said element in a second direction to effect another speed ratio drive of said wheels by said engine, a pressure differential operated motor, third means operable to move said element in said first direction in response to actuation of said motor under selected conditions and in said second direction in response to actuation of said motor under other selected conditions, dashpot means associated with said third means and adapted to cause motion of said element to be relatively slow compared to the motion of said motor, and manual means to move said element independently of retarding action by said dashpot means.

7. In a motor vehicle having a variable speed ratio transmission, a movable element associated with said transmission for changing the speed ratio drive, a first means for manually moving said element, an automatic means including a pressure differential operated motor adapted to be actuated in response to selected vehicle operating conditions and adapted to move said element in response to actuation of said motor, means for selectively rendering said first means or said automatic means operative to the exclusion of the other, dashpot means associated with said automatic means to cushion the motion transmitted from said motor to said element, said dashpot means being so disposed that when said first means is actuated it operates independently of a retarding action by said dashpot.

8. In a motor vehicle having a variable speed ratio transmission, a movable element associated with said transmission for changing the speed ratio drive thereof, a means for manually moving said element, an automatic means for moving said element, said automatic means including a pressure differential operated motor adapted to be actuated in response to predetermined vehicle operating conditions, dashpot means operably associated with said automatic means only and adapted to reduce shock in the movement of said element by said automatic means, and means to select either said manual means or said automatic means for moving said element and thereby to render said dashpot means selectively operative or inoperative.

9. In a motor vehicle having a variable speed ratio transmission, a movable element associated with said transmission and adapted to change the transmission speed ratio drive when moved, a pressure differential operated motor adapted to be actuated in response to predetermined vehicle operating conditions and operable to move said element as an incident to actuation of said motor, a spring interposed between said motor and said movable element and adapted to cushion the movement of said element in response to actuation of said motor, dashpot means operable to retard the movement of said element in response to actuation of said motor and manual means to move said element independently of the cushioning and retarding actions of said spring and said dashpot.

10. In a motor vehicle having a variable speed ratio transmission, a movable element associated with said transmission and adapted to effect one speed ratio drive therein when moved in one direction and another speed ratio drive therein when moved in a second direction, automatic means including a pressure differential operated motor adapted to move said element in a first direction under predetermined vehicle operating conditions and in a second direction under other vehicle operating conditions, a resilient connection operably interposed between said motor and said movable element adapted to cushion the movement of said element in response to actuation of said motor, dashpot means associated with said automatic means operable to retard the movement of said element in response to actuation of said motor and manual means to move said element in either direction independently of the cushioning and retarding actions of said resilient connection and said dashpot.

11. In a motor vehicle having a variable speed ratio transmission, a movable element associated with said transmission and adapted to effect one speed ratio drive therein when moved in one direction and another speed ratio drive therein when moved in a second direction, automatic means including a pressure differential operated motor adapted to move said element in a first direction under predetermined vehicle operating conditions and in a second direction under other vehicle operating conditions, a lost motion connection operably interposed between said motor and said element, dashpot means associated with said automatic means and adapted to retard the movement of said element in response to actuation of said motor and manual means to move said element in either direction independently of the lost motion and retarding actions of said lost motion connection and said dashpot.

12. In a motor vehicle having a variable speed ratio transmission, a transmission element adapted to change the transmission speed ratio drive when moved, a pressure differential operated motor adapted to be actuated in response to predetermined vehicle operating conditions and operable to move said element when actuated, a resilient connection operably interposed between said motor and said element, dashpot means controlling the movement of said element when the latter is moved in response to actuation of said motor and manual means to move said element independently of the springing and retarding actions of said resilient connection and said dashpot means.

13. In a motor vehicle having a variable speed ratio transmission, an element associated with said transmission and adapted to change the transmission speed ratio drive when moved, a pressure differential operated motor adapted to be actuated under selected vehicle operating conditions and operable to move said element when actuated, a first rotatable member, a second rotatable member, an operative connection between said first member and said motor adapted to rotate said first member in response to actuation of said motor, a spring connection between said members, a dashpot means operable to retard rotation of said second member and an operative connection between said second member and said element.

CARL A. NERACHER.

REFERENCES CITED

The following references are of record in the file of this patent:

UNITED STATES PATENTS

| Number | Name | Date |
|---|---|---|
| 845,113 | Noren | Feb. 26, 1907 |
| 1,979,488 | Perez | Nov. 6, 1934 |
| 1,996,805 | Gove | Apr. 9, 1935 |
| 2,071,785 | Ehrich | Feb. 23, 1937 |
| 2,177,459 | Price | Oct. 24, 1939 |
| 2,179,368 | Baade | Nov. 7, 1939 |
| 2,207,481 | Derungs | July 9, 1940 |
| 2,260,406 | Roche | Oct. 28, 1941 |